United States Patent
Sakamoto

(10) Patent No.: US 8,915,273 B2
(45) Date of Patent: Dec. 23, 2014

(54) PNEUMATIC TIRE

(75) Inventor: Daisuke Sakamoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1025 days.

(21) Appl. No.: 13/002,462

(22) PCT Filed: Jun. 10, 2009

(86) PCT No.: PCT/JP2009/060626
§ 371 (c)(1),
(2), (4) Date: Jan. 3, 2011

(87) PCT Pub. No.: WO2010/001701
PCT Pub. Date: Jan. 7, 2010

(65) Prior Publication Data
US 2011/0100521 A1 May 5, 2011

(30) Foreign Application Priority Data
Jul. 4, 2008 (JP) ................................ 2008-175272

(51) Int. Cl.
B60C 11/12 (2006.01)
B60C 11/13 (2006.01)
B60C 11/04 (2006.01)
B60C 11/00 (2006.01)

(52) U.S. Cl.
CPC ........... *B60C 11/042* (2013.04); *B60C 11/0008* (2013.04); *B60C 11/04* (2013.01); *B60C 11/1323* (2013.04); *B60C 2011/1254* (2013.04); *B60C 11/12* (2013.01); *B60C 2011/0025* (2013.04); *Y10S 152/03* (2013.01)
USPC ............. 152/209.24; 152/209.18; 152/DIG. 3

(58) Field of Classification Search
CPC .. B60C 11/0008; B60C 11/04; B60C 11/042; B60C 11/12; B60C 11/1236; B60C 11/1315; B60C 11/1323; B60C 2011/0025; B60C 2011/1254
USPC .......... 152/209.18, 209.24, 209.25, 900, 901, 152/DIG. 3
See application file for complete search history.

(56) References Cited

U.S. PATENT DOCUMENTS 4,878,526 A * 11/1989 Ochiai ..................... 152/209.22
6,112,787 A * 9/2000 Fukumoto et al. ....... 152/209.15
(Continued)

FOREIGN PATENT DOCUMENTS

| JP | 11-314506 A | 11/1999 |
| JP | 2003-002014 A | 1/2003 |

(Continued)

OTHER PUBLICATIONS

English machine translation of JP11-314506, dated Nov. 1999.*

(Continued)

*Primary Examiner* — Justin Fischer
*Assistant Examiner* — Robert Dye
(74) *Attorney, Agent, or Firm* — Sughrue Mion, PLLC

(57) ABSTRACT

There is provided a pneumatic tire capable of reducing rolling resistance and suppressing river wear of uneven wear.

A pneumatic tire according to the present invention comprises a tread portion provided with one or more circumferential grooves extending in parallel with a tire equator to define a plurality of land portions, wherein at least surface rubber of the tread portion has tan δ of not less than 0.02 and not more than 0.2, a wall angle of a widthwise outer wall of the circumferential groove is larger than a wall angle of a widthwise inner wall of the circumferential groove, a plurality of sipes extending in a direction across the tire equator are provided in the land portions, and a length of the sipe formed in an end portion of the land portion arranged adjacent to the circumferential groove in the widthwise outer side is longer than a length of the sipe formed in an end portion of the land portion arranged adjacent to the circumferential groove in the widthwise inner side.

4 Claims, 2 Drawing Sheets

(56) References Cited

U.S. PATENT DOCUMENTS

| | | | |
|---|---|---|---|
| 6,196,288 B1 * | 3/2001 | Radulescu et al. | 152/209.17 |
| 7,360,568 B2 * | 4/2008 | Stuhldreher | 152/209.18 |
| 7,481,257 B2 * | 1/2009 | Matsumura | 152/209.2 |
| 2007/0151646 A1 | 7/2007 | Ito | |

FOREIGN PATENT DOCUMENTS

| | | | |
|---|---|---|---|
| JP | 2004-058946 | * | 2/2004 |
| JP | 2007-045272 A | | 2/2007 |
| JP | 2007-182097 A | | 7/2007 |

OTHER PUBLICATIONS

English machine translation of JP2007-045272, dated Feb. 2007.*
European Search Report issued in European Application No. 09773279.6 dated Aug. 4, 2011.
Chinese Office Action dated Oct. 10, 2012 issued in Chinese Patent Application No. 200980126039.5.
International Search Report of PCT/JP2009/060626 dated Aug. 11, 2009.

* cited by examiner

FIG. 2
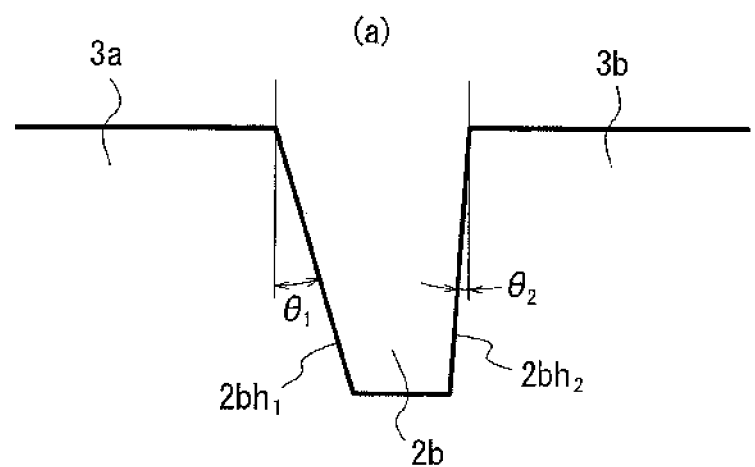
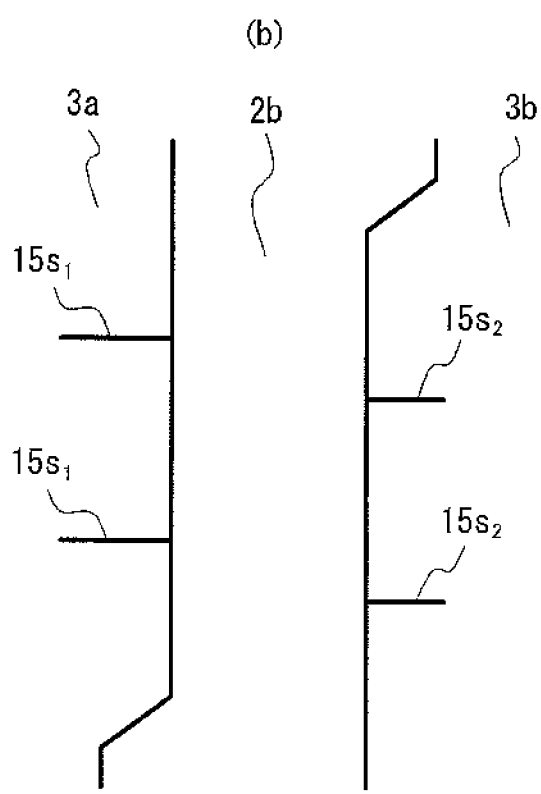

PNEUMATIC TIRE

TECHNICAL FIELD

The present invention relates to a pneumatic tire comprising a tread portion provided with one or more circumferential grooves extending in parallel with a tire equator to define a plurality of land portions, more particularly to a tire for a light truck comprising a plurality of rib-shaped land portions defined by a plurality of circumferential grooves.

RELATED ART

In a tire for a light truck comprising a tread portion provided with a land portion continuing in the circumferential direction, having a so-called rib pattern, there is a problem that so-called river wear is easy to occur, which is a phenomenon that only an end portion of a rib is unevenly and locally worn in the circumferential direction. This river wear is considered to be caused in such a way that firstly, minute difference occurs in a rib end portion by a lateral force during tire running, secondly, a shear force and slip in the circumferential direction due to a diameter difference between the tire equatorial plane and the rib end portion occurs in this difference portion and finally this difference spreads in the tire width direction to result in the above-mentioned uneven wear.

As a conventional technique to suppress river wear, for example, JP2007-182097A discloses a tire to reduce stiffness in a rib end portion by providing a number of short sipes in the rib end portion, the sipes terminating in the rib.

A tire having a rib pattern means a tire without a lug groove (a tire width groove) having a depth of not less than ⅓ of a depth of a circumferential groove.

DISCLOSURE OF THE INVENTION

Problems to be Solved by the Invention

In order to deal with environmental problems, it has been demanded in recent years to reduce rolling resistance of a tire, which leads to a fuel-efficient car. Since rolling resistance of a tire occurs mainly in rubber of a tread portion, it is effective to change the rubber used in this tread portion to rubber with loss tangent (tan δ).

However, in the case of using the tread rubber with low tan δ, accordingly, with low hysteresis loss, since a friction coefficient μ between the tread rubber and a road surface is lowered, slipping with respect to the road surface becomes large so that river wear is easier to occur.

It is, therefore, an object of the present invention to provide a pneumatic tire capable of suppressing river wear, which is easy to occur in the case of using the tread rubber with low tan δ, especially a pneumatic tire having a rib pattern.

Means for Solving the Problem

The subject matter of the present invention is as follows.
(1) A pneumatic tire comprising a tread portion provided with one or more circumferential grooves extending in parallel with a tire equator to define a plurality of land portions, wherein
at least surface rubber of the tread portion has tan δ of not less than 0.02 and not more than 0.2,
a wall angle of a widthwise outer wall of the circumferential groove is larger than a wall angle of a widthwise inner wall of the circumferential groove,
a plurality of sipes extending in a direction across the tire equator are provided in the land portions, and
a length of the sipe formed in an end portion of the land portion arranged adjacent to the circumferential groove in the widthwise outer side is longer than a length of the sipe formed in an end portion of the land portion arranged adjacent to the circumferential groove in the widthwise inner side.

A wall angle of the circumferential groove means an angle formed by a wall of the circumferential groove and a normal line to the tread surface in an end portion of the land portion adjacent to the circumferential groove.
(2) The pneumatic tire according to the above (1), wherein
a difference between the wall angle of the widthwise outer wall of the circumferential groove and the wall angle of the widthwise inner wall of the circumferential groove is not less than 5 degrees and not more than 10 degrees.
(3) The pneumatic tire according to the above (1) or (2), wherein
a difference between the length of the sipe formed in the end portion of the land portion arranged adjacent to the circumferential groove in the widthwise outer side and the length of the sipe formed in the end portion of the land portion arranged adjacent to the circumferential groove in the widthwise inner side is not less than 0.5 mm and not more than 1.5 mm.
(4) The pneumatic tire according to any one of the above (1) to (3), wherein
the tread portion is provided with two or more of the circumferential grooves,
a wall angle of a widthwise outer wall of an outermost circumferential groove located outermost among the circumferential grooves in the tire width direction is larger than a wall angle of a widthwise inner wall of the outermost circumferential groove, and
a length of the sipe formed in an end portion of a rib arranged adjacent to the outermost circumferential groove in the widthwise outer side is longer than a length of the sipe formed in an end portion of a rib arranged adjacent to the outermost circumferential groove in the widthwise inner side.

Effect of the Invention

According to the present invention, it is possible to provide a pneumatic tire capable of reducing rolling resistance by using a tread rubber with low tan δ and suppressing river wear, which is significant in the tread rubber with low tan δ.

BRIEF DESCRIPTION OF THE DRAWINGS

FIG. 2a is a sectional view taken along line A-A in FIG. 1 and FIG. 2b is an enlarged view of a part circled in FIG. 1.

BEST MODE FOR CARRYING OUT THE INVENTION

Figure 1:
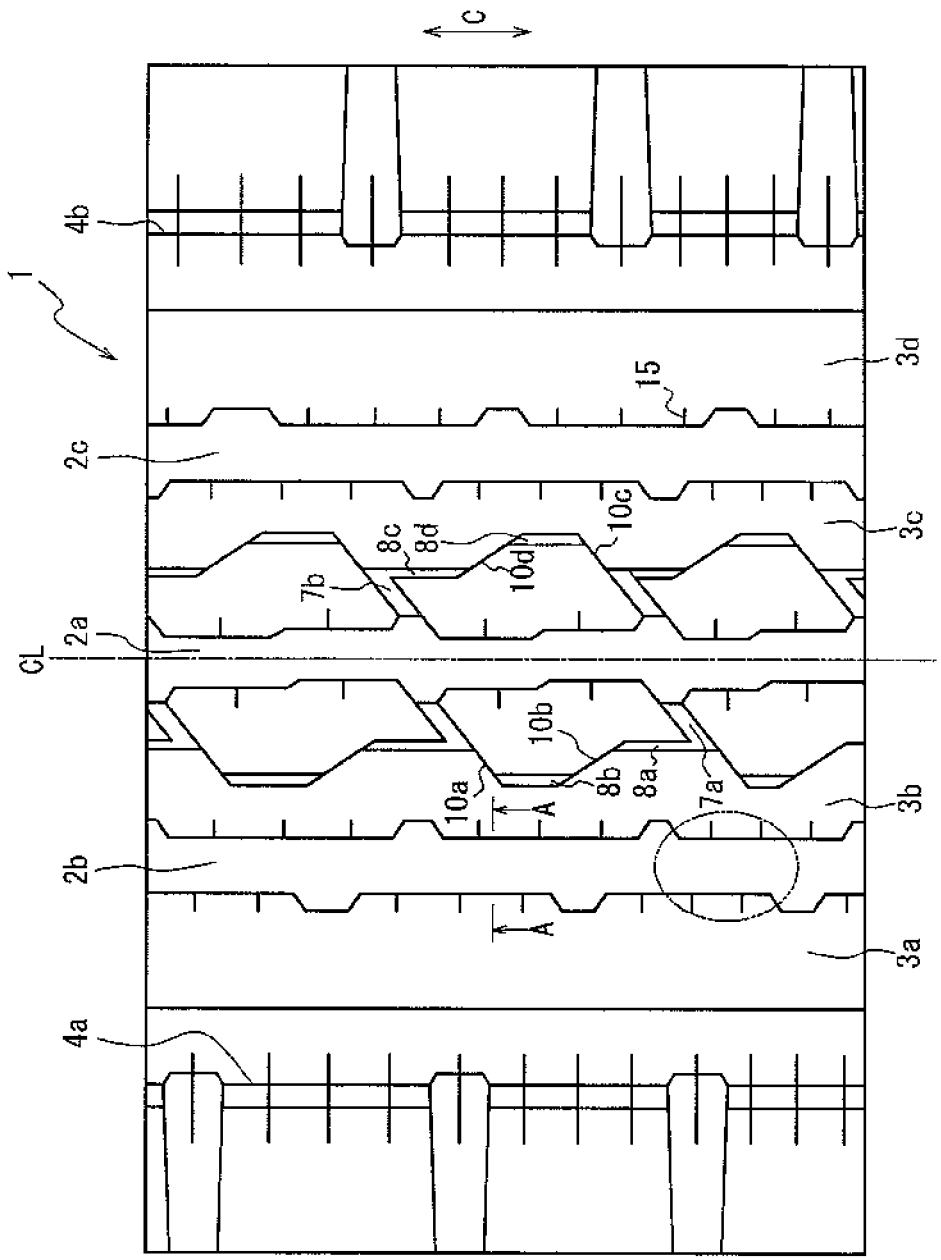
FIG. 1 is a view showing a part of a tread pattern of a pneumatic tire according to the present invention.

Hereinafter, an embodiment of a pneumatic tire of the present invention will be explained in detail with reference to drawings.

FIG. 1 is a view showing a part of a tread pattern of a pneumatic tire according to the present invention. The pneumatic tire comprises a tread portion 1 shown in FIG. 1 provided with one or more circumferential grooves extending in the tire circumferential direction C, three circumferential grooves in the illustrated example, consisting of one central circumferential groove 2a located on a tire equator CL and a pair of side circumferential grooves 2b, 2c, each located between this central circumferential groove 2a and either of tread edges 4a, 4b. A plurality of land portions, four ribs 3a, 3b, 3c, 3d in the illustrated example are defined by these circumferential grooves.

The ribs 3b, 3c are respectively provided with a plurality of lateral grooves 7a, 7b extending from the central circumferential groove 2a in the direction intersecting the tire circumferential direction C, the first small groove portions 8a, 8c opened to the lateral grooves 7a, 7b and extending in the tire circumferential direction C, lateral sipes 10b, 10d opened to the first small groove portions 8a, 8c, the second small groove portions 8b, 8d opened to the lateral sipes 10b, 10d and extending in the tire circumferential direction C, and lateral sipes 10a, 10c opened to the second small groove portions 8b, 8d and the lateral grooves 7a, 7b. According to the above-mentioned configuration, it is possible to improve drainage performance as well as to suppress uneven wear.

In addition, the end portion of the rib 3 is provided with one-end-open sipes 15 extending from the circumferential groove 2 in the direction across the tire equator CL. The one-end-open sipe 15 preferably extends in the substantially tire widthwise direction because, if it is inclined with respect to the circumferential groove 2, an acute angle portion is formed in the rib 3 and this acute angle portion becomes a starting point of uneven wear.

It is noted that, since the tread portion 1 of the present invention is characterized in its configuration, known structures other than the tread portion 1 may be employed and their explanation is omitted.

It is important that at least surface rubber of the tread portion has tan δ of not less than 0.02 and not more than 0.2. As mentioned above, by using a tire with the rubber of the tread portion having small tan δ, it is possible to reduce rolling resistance of the tire and thus to contribute to good mileage of a vehicle, on which this tire is mounted.

In case that tan δ of the rubber of the tread portion 1 is less than 0.02, a friction coefficient on a dry road surface and a wet road surface becomes excessively low, which may result in degradation of braking performance and driving performance. On the other hand, in case that tan δ of the rubber of the tread portion 1 is more than 0.2, the advantage of reduction of rolling resistance may not be sufficiently attained.

In a tire having a rib pattern for a light truck, ground contact pressure of the land portion arranged in the inner side (the tire equator CL side) of the side circumferential groove tends to be lower than ground contact pressure of the land portion arranged in the outer side (tread edge 4a, 4b side) thereof. When ground contact pressure of the land portion becomes lower, it is easy to slip in the tire circumferential direction. As a result, river wear occurs in the land portion arranged in the inner side of the side circumferential groove. Therefore, in order to raise ground contact pressure of the land portion arranged in the inner side of the side circumferential groove, it is important that a wall angle $\theta_1$ of a widthwise outer wall $2bh_1$ of the side circumferential groove 2b is larger than a wall angle $\theta_2$ of a widthwise inner wall $2bh_2$ of the side circumferential groove 2b as shown in FIG. 2a. With this, ground contact pressure in the end portion of the rib 3b is raised so that river wear may be suppressed.

It is caused by so-called crushing that ground contact pressure of the land portion with a small wall angle becomes higher. In other words, since the land portion of the tread portion 1 in the ground contact surface when the tire is rolling under load is compressed in the tire radial direction and expanded in the tire axial direction, the expanded amount of the land portion with a small wall angle is large, thereby raising ground contact pressure of the end portion of the land portion.

In addition, there is a way that the end portion of the rib 3b is cut and ground contact pressure of the rib 3b is reduced in order to control ground contact pressure of the ribs 3a, 3b arranged in the both sides of the side circumferential groove 2b. However, this way is not suitable for the present invention because this end portion becomes the core of slip due to a diameter difference, thereby prompting river wear difference.

However, the land portion with a smaller groove wall angle has lower stiffness in the tire circumferential direction as compared to the land portion with a larger groove wall angle so that the tread portion surface is largely moved during running. As a result, it is found that the above-mentioned effect of raising ground contact pressure of the land portion with a small groove wall angle is not sufficiently exerted. In order to sufficiently exert the effect of raising ground contact pressure, it is important, as shown in FIG. 2b, that a length of the sipe $15s_1$ in the end portion of the rib 3a which is the land portion arranged adjacent to the side circumferential groove 2b in the widthwise outer side is longer than a length of the sipe $15s_2$ in the end portion of the rib 3b which is the land portion arranged adjacent to the side circumferential groove 2b in the widthwise inner side. With this, stiffness of the land portion in the circumferential direction can be optimized.

Stiffness of the land portion in the circumferential direction can be optimized by adjustment of a depth of the sipes $15s_1$, $15s_2$, an area (length×depth) of the sipes $15s_1$, $15s_2$ or a density of the sipes $15s_1$, $15s_2$ other than the adjustment of a length of the sipes $15s_1$, $15s_2$. In the case of adjusting stiffness of the land portion in the circumferential direction by an area of the sipes $15s_1$, $15s_2$, it is preferable that an area of the sipe $15s_1$ is 1.2 to 2.0 times of an area of the sipe $15s_2$.

It is preferable that an angle difference between a wall angle $\theta_1$ of the widthwise outer wall $2bh_1$ of the side circumferential groove 2b and a wall angle $\theta_2$ of the widthwise inner wall $2bh_2$ of the side circumferential groove 2b is not less than 5 degrees and not more than 10 degrees.

In case that this angle difference is less than 5 degrees, ground contact pressure of the rib edge of the rib 3b arranged in the tire widthwise inner side of the side circumferential groove 2b cannot be sufficiently raised. On the other hand, in case that the angle difference is more than 10 degrees, the wall angle $\theta_1$ of the widthwise outer groove wall $2bh_1$ becomes excessively large and the ground contact area of the rib 3a may be reduced.

It is noted that a groove wall angle is determined depending on a basic shape of a tire.

It is preferable that a difference between a length of the sipe $15s_1$ formed in the end portion of the rib 3a which is the land portion adjacent to the side circumferential groove 2b in the widthwise outer side and a length of the sipe $15s_2$ formed in the end portion of the rib 3b which is the land portion adjacent to the side circumferential groove 2b in the widthwise inner side is not less than 0.5 mm and not more than 1.5 mm.

In case that the difference of these lengths is less than 0.5 mm, stiffness in the circumferential direction cannot be sufficiently optimized. On the other hand, in case that the difference is more than 1.5 mm, stiffness of the end portion of the rib 3a which is the land portion arranged in the tire widthwise outer side becomes excessively low and heel and toe uneven wear may occur between sipes $15s_1$.

It is noted that a length of the sipe is determined depending on a basic shape of a tire.

In case that a plurality of circumferential grooves are provided, it is preferable that a wall angle of a widthwise outer wall of an outermost circumferential groove located outermost among the plurality of circumferential grooves in the tire width direction (that is, a circumferential groove located in the shoulder side) is larger than a wall angle of a widthwise inner wall of the outermost circumferential groove, and a length of the sipe formed in an end portion of a rib arranged adjacent to the outermost circumferential groove in the widthwise outer side is longer than a length of the sipe formed in an end portion of a rib arranged adjacent to the outermost circumferential groove in the widthwise inner side.

The land portion in the shoulder side is easy to be the core of self-excited wear by a side force and therefore, river wear is easy to occur.

It is noted that the present invention is advantageous even in the case of a tread pattern having one circumferential groove. However, the case where one circumferential groove is formed on the tire equator CL is not considered since river wear which is a problem of the present invention does not become a problem.

Example

Example tires 1-5, Conventional Example tires 1, 2 and Comparative Example tires 1, 2, each of which has a tire size of 195/85R16114/112L, the tread pattern shown in FIG. 1 and the specifications shown in Table 1 are experimentally produced. Each experimental tire is mounted on a rim of 5.5J to be a tire/rim assembly. This assembly is applied with an internal pressure of 600 kPa and then under a condition of regular load of 1180 kg evaluated for rolling resistance and river wear as explained below.

The assembly is driven at a constant speed of 80 km/h using a drum and moved without power by throwing out a clutch. Rolling resistance of the tire simplex is measured based on decrease in the drum speed and thus-measured value is indexed. The larger value means the larger rolling resistance, that is, worse evaluation result.

After each experimental tire is mounted on a three-ton truck and this truck is run at the average speed about 60 km/h for 50,000 km, river wear difference is measured and indexed with Conventional Example tire 1 being defined as the standard. The larger value means the larger river wear difference, that is, worse evaluation result.

In Table 1 tan $\delta$ of the rubber of the tread portion surface is measured at 30 degrees Celsius. The groove wall angle (out/in) means a wall angle of the widthwise outer wall of the side circumferential grooves 2b, 2c/a wall angle of the widthwise inner wall of the side circumferential grooves 2b, 2c in FIG. 1. Similarly, the sipe length (out/in) means a length of the sipe formed in the ribs 3a, 3d respectively adjacent to the side circumferential grooves 2b, 2c in the widthwise outer side/a length of the sipe formed in the rib 3b, 3c respectively adjacent to the side circumferential grooves 2b, 2c in the widthwise inner side in FIG. 1.

TABLE 1

|  | Conventional Example 1 | Conventional Example 2 | Comparative Example 1 | Comparative Example 2 | Example 1 | Example 2 | Example 3 | Example 4 | Example 5 |
|---|---|---|---|---|---|---|---|---|---|
| tan δ | 0.3 | 0.12 | 0.12 | 0.12 | 0.12 | 0.12 | 0.12 | 0.12 | 0.12 |
| Groove wall angle (out/in) [°] | 14/14 | 14/14 | 14/14 | 18/10 | 18/10 | 16/13 | 20/8 | 18/10 | 18/10 |
| Sipe length (out/in) [mm] | 3.0/3.0 | 3.0/3.0 | 3.0/2.0 | 3.0/3.0 | 3.0/2.0 | 3.0/2.0 | 3.0/2.0 | 2.8/2.4 | 3.5/1.5 |
| Rolling resistance | 100 | 82 | 81 | 83 | 82 | 81 | 81 | 82 | 82 |
| River wear difference | 100 | 181 | 145 | 137 | 95 | 99 | 97 | 95 | 95 |

It is found that the increased river wear difference due to the reduction of rolling resistance by the reduction of tan δ can be suppressed at the same level as Conventional Examples by adjusting the groove wall angle and the sipe length.

As stated above, it is possible to provide a pneumatic tire capable of reducing rolling resistance and suppressing river wear of uneven wear.

The invention claimed is:

1. A pneumatic tire comprising a tread portion provided with one or more circumferential grooves extending in parallel with a tire equator to define a plurality of land portions, wherein
    at least surface rubber of the tread portion has tan δ of at 30 degrees Celsius of not less than 0.02 and not more than 0.2,
    a wall angle of a widthwise outer wall of at least one side circumferential groove is larger than a wall angle of a widthwise inner wall of the at least one side circumferential groove, the at least one side circumferential groove being at least one of the circumferential grooves located between the tire equator and a tread end,
    a plurality of sipes extending in a direction across the tire equator are provided in the land portions, and
    lengths of all of the sipes formed in an end portion of the land portion arranged adjacent to the at least one side circumferential groove in the widthwise outer side are respectively longer than lengths of all of the sipes formed in an end portion of the land portion arranged adjacent to the at least one side circumferential groove in the widthwise inner side, and
    all of the sipes each terminate in the respective land portion.

2. The pneumatic tire according to claim 1, wherein
    a difference between the wall angle of the widthwise outer wall of the at least one side circumferential groove and the wall angle of the widthwise inner wall of the at least one side circumferential groove is not less than 5 degrees and not more than 10 degrees.

3. The pneumatic tire according to claim 1, wherein
    a difference between the length of the sipe formed in the end portion of the land portion arranged adjacent to the at least one side circumferential groove in the widthwise outer side and the length of the sipe formed in the end portion of the land portion arranged adjacent to the at least one side circumferential groove in the widthwise inner side is not less than 0.5 mm and not more than 1.5 mm.

4. The pneumatic tire according to claim 1, wherein
the tread portion is provided with two or more of the circumferential grooves,
a wall angle of a widthwise outer wall of an outermost circumferential groove located outermost among the circumferential grooves in the tire width direction is larger than a wall angle of a widthwise inner wall of the outermost circumferential groove, and
a length of the sipe formed in an end portion of a rib arranged adjacent to the outermost circumferential groove in the widthwise outer side is longer than a length of the sipe formed in an end portion of a rib arranged adjacent to the outermost circumferential groove in the widthwise inner side.

* * * * *